US008782693B2

(12) United States Patent
Saltonstall et al.

(10) Patent No.: US 8,782,693 B2
(45) Date of Patent: Jul. 15, 2014

(54) INTERFACES TO ALLOW VIDEO AD SERVING INTO A MOBILE PHONE APPLICATION VIDEO STREAM

(75) Inventors: Max Saltonstall, New York, NY (US); Payam Shodjai, New York, NY (US); Samreen Dhillon, London (GB); Heschi Kreinick, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/409,051

(22) Filed: Feb. 29, 2012

(65) Prior Publication Data

US 2013/0227607 A1    Aug. 29, 2013

(51) Int. Cl.
*H04N 7/10* (2006.01)
*H04N 7/025* (2006.01)
*H04N 7/16* (2011.01)
*H04N 21/234* (2011.01)
*H04N 21/454* (2011.01)
*H04N 21/2547* (2011.01)
*H04N 21/262* (2011.01)
*H04N 21/431* (2011.01)
*H04N 21/433* (2011.01)
*H04N 21/458* (2011.01)

(52) U.S. Cl.
CPC ....... *H04N 21/23424* (2013.01); *H04N 21/454* (2013.01); *H04N 21/2547* (2013.01); *H04N 21/26241* (2013.01); *H04N 21/4316* (2013.01); *H04N 21/4331* (2013.01); *H04N 21/458* (2013.01)
USPC .............. 725/34; 725/32; 725/35; 725/62

(58) Field of Classification Search
CPC .......... H04N 21/23424; H04N 21/454; H04N 21/2547; H04N 21/26241; H04N 21/4316; H04N 21/4331; H04N 21/458
USPC ........................................................... 725/32
See application file for complete search history.

(56) References Cited

U.S. PATENT DOCUMENTS

| 8,074,882 | B2 | 12/2011 | Dmitriev et al. |
| 8,121,893 | B1 | 2/2012 | Krikheli et al. |
| 2007/0061204 | A1* | 3/2007 | Ellis et al. ........................ 705/14 |
| 2008/0178211 | A1* | 7/2008 | Lillo et al. ....................... 725/32 |
| 2009/0199234 | A1* | 8/2009 | Mukerji et al. ................. 725/34 |
| 2010/0037204 | A1 | 2/2010 | Lin et al. |
| 2010/0211466 | A1 | 8/2010 | Clarke-Martin et al. |
| 2011/0161912 | A1* | 6/2011 | Eteminan et al. ............. 717/101 |
| 2011/0173071 | A1* | 7/2011 | Meyer et al. ................ 705/14.54 |
| 2011/0288913 | A1 | 11/2011 | Waylonis et al. |
| 2011/0289531 | A1 | 11/2011 | Moonka et al. |

(Continued)

OTHER PUBLICATIONS

MD&D News Staff "SDK Supports New Ad Formats on the iPad", Apr. 15, 2010, 1 page.
YuMe Press Release: "YuMe to Power LG Electronics' Global Smart TV Ad Platform, First Video Advertising Platform for Internet-Connected TVs; Announces Charter Advertiser Toyota", Nov. 2, 2011, 2 pages.

(Continued)

*Primary Examiner* — Justin Shepard
(74) *Attorney, Agent, or Firm* — Foley and Lardner LLP; John D. Lanza

(57) ABSTRACT

A method of providing advertisements includes requesting, by a software development kit for an application, an advertisement from an advertisement server in response to playback of a video content item by the application; receiving the advertisement from the advertisement server based on the requesting; displaying, with the application, the advertisement received from the advertisement server; collecting a set of metrics while the advertisement is displayed; and providing the set of metrics to the advertisement server.

26 Claims, 5 Drawing Sheets

(56) References Cited

U.S. PATENT DOCUMENTS

2011/0295660 A1 12/2011 Lee
2011/0321003 A1 12/2011 Doig et al.
2011/0321167 A1 12/2011 Wu et al.

OTHER PUBLICATIONS

International Search Report and Written Opinion for PCT/US2013/026172, mailing date Jun. 25, 2013, 12 pages.

* cited by examiner

US 8,782,693 B2

INTERFACES TO ALLOW VIDEO AD SERVING INTO A MOBILE PHONE APPLICATION VIDEO STREAM

TECHNICAL FIELD

The disclosure relates to the field of content presentation systems and methods, and, in particular, to video content presentation.

BACKGROUND

Advertisers provide advertisements in different forms in order to attract consumers. An advertisement ("ad") is a piece of information designed to be used in whole or part by a user, for instance, a particular consumer. Advertisements can be provided in electronic form. For instance, online advertisements can be provided as banner advertisements on a web page, as advertisements presented with search results, or as advertisements presented in a mobile application.

One can refer to the inclusion of an advertisement in a medium, e.g., a web page or a mobile application, as an impression. An advertising system can include an advertisement in a web page, for instance, in response to one or more keywords in a user search query input to a search engine. If a user selects the presented advertisement (e.g., by "clicking" the ad), the user is generally taken to another location associated with the advertisement, for instance, to another, particular web page.

SUMMARY OF THE DISCLOSURE

A method of providing advertisements includes, but is not limited to any one or combination of: (i) requesting, by a software development kit for an application, an advertisement from an advertisement server in response to playback of a video content item by the application; (ii) receiving the advertisement from the advertisement server based on the requesting; (iii) displaying, with the application, the advertisement received from the advertisement server; (iv) collecting a set of metrics while the advertisement is displayed; and (v) providing the set of metrics to the advertisement server.

In various embodiments, the advertisement comprises a video advertisement.

In various implementations, the application is executed on a mobile device.

In various embodiments, the advertisement comprises one or more of a text advertisement, a graphic advertisement, a still-image advertisement, a banner advertisement, and a link advertisement.

In various embodiments, the advertisement is displayed during playback of the video content item.

In various embodiments, the advertisement is displayed before playback of the video content item.

In various embodiments, the advertisement is displayed after playback of the video content item.

In various embodiments, the advertisement is overlaid on the video content item during playback of the video content item.

In various embodiments, the set of metrics measures user interactions with the advertisement while the advertisement is displayed.

In various embodiments, the playback of the video content item by the application is paused while the advertisement is displayed.

In various embodiments, the video content item includes an advertisement slot. The advertisement is displayed in the advertisement slot.

In various embodiments, the video content item includes an advertisement slot. The advertisement is requested based on the advertisement slot.

In various embodiments, receiving the advertisement from the advertisement server based on the requesting includes (but is not limited to any one or combination): receiving a response from the advertisement server based on the requesting; parsing the response to obtain information for receiving the advertisement; and receiving the advertisement based on the parsed response. In some embodiments, the response is a Video Ad Serving Template (VAST)-formatted extended markup language (XML) document.

A computer program product for providing advertisements includes a tangible computer-readable storage medium including (but is not limited to any one or combination of) code for: requesting, by a software development kit for an application, an advertisement from an advertisement server in response to playback of a video content item by the application; receiving the advertisement from the advertisement server based on the requesting; displaying the advertisement received from the advertisement server; collecting a set of metrics while the advertisement is displayed; and providing the set of metrics to the advertisement server.

A system of providing advertisements includes, but is not limited to any one or combination of, a software development kit object and a metric tracking engine. The software development kit object is for requesting an advertisement from an advertisement server in response to playback of a video content item by an application. The software development kit object is for displaying the advertisement received from the advertisement server. The metric tracking engine is for collecting a set of metrics while the advertisement is displayed. The metric tracking engine is for providing the set of metrics to the advertisement server.

A system of providing advertisements includes, but is not limited to any one or combination of, a software development kit. The software development kit is for developing an application. The application is for providing playback of a video content item. The software development kit is for configuring the application to request and display an advertisement from an advertisement server in response to playback of the video content item by the application. The software development kit is for configuring the application to collect a set of metrics while the advertisement is displayed and to provide the set of metrics to the advertisement server.

DETAILED DESCRIPTION

Figure 1:
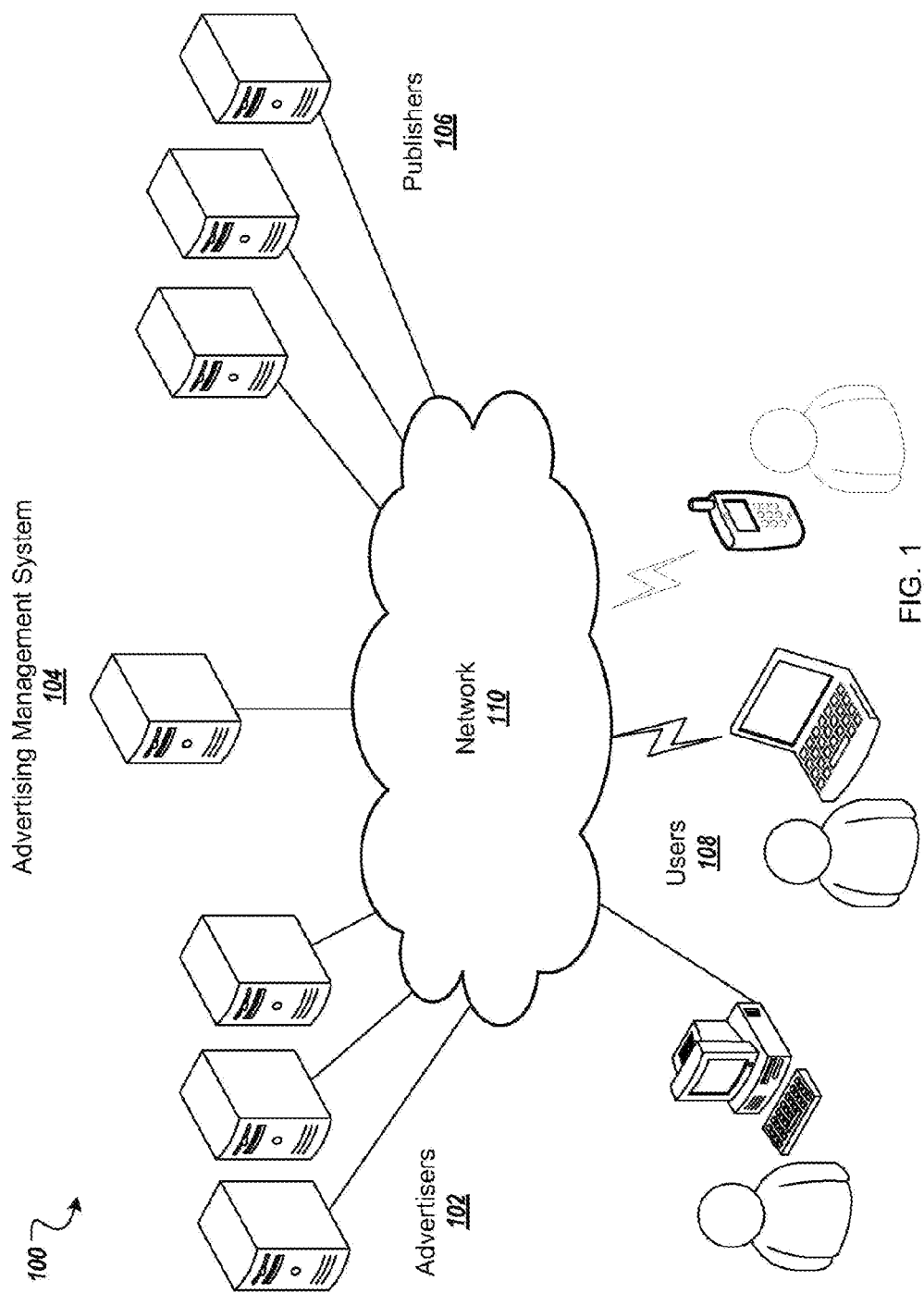
FIG. 1 is a block diagram of an advertising system according to various implementations of the disclosure.

Various implementations relate to a software development kit (SDK) for applications (e.g., mobile applications) that allows a developer to define how video advertisements (or other types of advertisements) should appear in a video stream presented by the application. The SDK may be used to program an object of the application or otherwise control the application to interact with a video advertisement server to request a video advertisement, play the video advertisement, and report information relating to the video advertisement. Accordingly, an application developer can specify when (e.g., at a designated time) a video advertisement should be displayed during playback of a video stream. In some implementations, the video advertisement may be displayed before, in the middle, after, or overlaid on the video stream. For instance, at a designated time during playback of a video stream, the application (as programmed by the SDK) sends a request for a video advertisement to an advertisement server. The application receives a response from the advertisement server in response to the request. The application parses the response to obtain information for playing a video advertisement in response to the request. While the video advertisement is playing, the application may monitor or track metrics relating to the video advertisement. The metrics can include, for instance, whether a user pauses, mutes, expands, etc. the video advertisement and/or other interactions of the user with the advertisement. The application may deliver the metrics to the advertisement server. Once playback of the video advertisement completes, playback of the video stream may resume.

Accordingly, various implementations allow a developer to include video advertisements (e.g., including Video Ad Serving Template (VAST) support) in a video stream of a native mobile application (e.g., iOS, Android) much like developers can integrate video advertisements (e.g., using Flash or HTML5-based interfaces) into a video stream within an HTML environment.

Throughout various implementations, users can be presented with content items (e.g., ads). Content items can be displayed in various forms on a user device, such as a mobile device (e.g., a mobile phone, a personal digital assistant (PDA), a tablet computer, etc.). Different ways in which the user interacts with the content item can be counted as a conversion. For instance, the user can click on the content item to reach a particular landing page, the user can buy a product from the landing page, or the user can interact with the content item in other ways. The conversion can be tracked in order to, for instance, charge advertisers for the conversion.

In some implementations, content items can be presented within applications executing on a mobile device. For instance, a mobile device can include a number of distinct applications, each providing different application content (e.g., a news application, a game application, a video-presentation application, etc.). Content items (e.g., ads) can be presented along with the application content while the application is executing.

While reference will be made below to advertising systems and methods, other forms of content including other forms of sponsored content can be managed, presented, and tracked in accordance with the description below.

FIG. 1 is a block diagram of an advertising system 100 according to various implementations of the disclosure. In some implementations, one or more advertisers 102 can directly, or indirectly, enter, maintain, and track advertisement information in an advertising management system 104. Though reference is made to advertising, other forms of content, including other forms of sponsored content, can be delivered by the system 100.

Ad content can include text, graphics, still-images, video, audio, audio and video, multimedia, banners, links (e.g., advertising providing a hyperlink to an advertiser's website), and other web or television programming related data. As such, ad content can be formatted differently, based on whether the ad content is primarily directed to websites, media players, email, television programs, closed captioning, etc. For example, ad content directed to a website may be formatted for display in a frame within a web browser. In other examples, ad content may be delivered in an RSS (Real Simple Syndication) feed, or ad content may be delivered relative to a radio item (such as before, during or after a radio stem). In some instances, ad content directed to a video player may be presented "in-stream" as a video content item is played in the video player. In some implementations, in-stream ad content may replace the video content item in a video player for some period of time or may be inserted between portions of the video content item. An in-stream advertisement can be placed pre-roll, post-roll, or mid-roll relative to video feature content. An in-stream advertisement may include video, audio, text, animated images, still images, or some combination thereof.

In some implementations, a "video content item" is an item of content that includes content that can be perceived visually when played, rendered, or decoded. A video content item includes video data, and optionally audio data and metadata. Video data includes content in the video content item that can be perceived visually when the video content item is played, rendered, or decoded. Audio data includes content in the video content item that can be perceived aurally when the video content item is played, decoded, or rendered. A video content item may include video data and any accompanying audio data regardless of whether or not the video content item is ultimately stored on a tangible storage medium (e.g., a computer-readable storage medium). A video content item may include (but is not limited to, for example, a live or recorded television program, a live or recorded theatrical or dramatic work, a music video, a televised event (e.g., a sports event, a political event, a news event, etc.), video voicemail, and/or the like. Each of different forms or formats of the same video data and accompanying audio data (e.g., original, compressed, packetized, streamed, etc.) may be considered to be a video content item (e.g., the same video content item, or different video content items).

A video content item can also include many types of associated data, such as video data, audio data, closed-caption or subtitle data, a transcript, content descriptions (e.g., title, actor list, genre information, first performance or release date, etc.), related still images, user-supplied tags and ratings, etc. Some of this data, such as the description, can refer to the entire video content item, while other data (e.g., the closed-caption data) may be temporally-based or timecoded. In some implementations, the temporal-based data may be used to detect scene or content changes to determine relevant portions of that data for targeting ad content to users.

In some implementations, an "audio content item" is an item of content that can be perceived aurally when played, rendered, or decoded. An audio content item includes audio data and optionally metadata. The audio data includes content in the audio content item that can be perceived aurally when the video content item is played, decoded, or rendered. An audio content item may include audio data regardless of whether or not the audio content item is ultimately stored on a tangible medium. An audio content item may include, for example, a live or recorded radio program, a live or recorded theatrical or dramatic work, a musical performance, a sound recording, a televised event (e.g., a sports event, a political event, a news event, etc.), voicemail, etc. Each of different forms or formats of the audio data (e.g., original, compressed, packetized, streamed, etc.) may be considered to be an audio content item (e.g., the same audio content item, or different audio content items).

One or more publishers 106 may submit requests for advertisements to the advertising management system 104. The advertising management system 104 responds by sending advertisements to the requesting publisher 106 for placement on or association with one or more of the publisher's content items (e.g., web properties). Web properties can include (but are not limited to) web pages, television and/or radio advertising slots, print media space, and/or the like.

Other entities, such as users 108 and the advertisers 102, can provide usage information to the advertising management system 104, such as, for instance, whether or not a conversion or click-through related to an advertisement has occurred. This usage information can include measured or observed user behavior related to advertisements that have been served. The advertising management system 104 can perform financial transactions, for instance, crediting the publishers 106 and charging the advertisers 102 based on the usage information.

The advertisement management system 104 may include information concerning accounts, campaigns, creatives, targeting, etc. The term "account" relates to information for a given advertiser (e.g., a unique email address, a password, billing information, etc.). A "campaign," "advertising campaign," or "ad campaign" refers to one or more groups of one or more advertisements, and may include a start date, an end date, budget information, targeting information, syndication information, and/or the like.

A computer network 110, such as a local area network (LAN), wide area network (WAN), the Internet, or a combination thereof, connects the advertisers 102, the advertising management system 104, the publishers 106, and the users 108.

In some implementations, the publisher 106 is a general content server that receives requests for content (e.g., articles, discussion threads, music, video, graphics, search results, web page listings, information feeds, etc.), and retrieves the requested content in response to the request. The content server can submit a request for advertisements to an advertisement server in the advertising management system 104. The advertisement request can include the number of advertisements desired. The advertisement request can also include content request information. This information can include (but is not limited to) the content itself (e.g., page, video broadcast, radio show, or other type of content), a category corresponding to the content or the content request (e.g., arts, business, computers, arts-movies, arts, music, etc.), part or all of the content request, content age, content type (e.g., text, graphics, video, audio, mixed media, etc.), geo-location information, etc.

In some implementations, the content server or a client browser can combine the requested content with one or more of the advertisements provided by the advertising management system 104. The combined content and advertisements can be sent to the users 108 that requested the content for presentation in a viewer (e.g., a browser or other content display system). The content server can transmit information about the advertisements back to the advertisement server, including information describing how, when, and/or where the advertisements are to be rendered (e.g., in HTML, JavaScript™, etc.).

In some implementations, the publisher 106 is a search service. A search service can receive queries for search results. In response, the search service can retrieve relevant search results from an index of documents (e.g., from an index of web pages). Search results can include, for instance (but not limited to), lists of web page titles, snippets of text extracted from those web pages, hypertext links to those web pages, and/or the like. The search results may be grouped into a predetermined number of (e.g., ten) search results.

The search service can submit a request for advertisements to the advertising management system 104. The request can include a number of advertisements desired. This number can depend on the search results, the amount of screen or page space occupied by the search results, the amount of screen or page space available for the search results and the ads, the size and shape of the ads, and/or the like The request for advertisements can also include the query (e.g., as entered or parsed), information based on the query (such as geo-location information, whether the query came from an affiliate and an identifier of such an affiliate), information associated with (and/or based on) the search results, and/or the like. The information can include, for instance (but not limited to), identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, and/or the like. In some implementations, IR scores are computed from, for instance, dot products of feature vectors corresponding to a query and a document, page rank scores, combinations of IR scores and page rank scores, and/or the like.

In some implementations, the advertising management system 104 includes an auction process to select advertisements from the advertisers 102. For instance, the advertisers 102 may be permitted to select, or bid, an amount the advertisers 102 are willing to pay for each presentation of or interaction with (e.g., click) of an advertisement, which may be an amount an advertiser pays when, for instance, a user clicks on an advertisement. The cost-per-click can include a maximum cost-per-click, which may be the maximum amount the advertiser is willing to pay for each click of an advertisement based on a keyword (e.g., a word or words in a query). Other bid types, however, can also be used. Based on these bids, advertisements can be selected and ranked for presentation.

The search service can combine the search results with one or more of the advertisements provided by the advertising management system 104. This combined information can then be forwarded to the users 108 that requested the content. The search results can be maintained as distinct from the ads, so as not to confuse the user between paid advertisements and presumably neutral search results.

In some implementations, one or more of the publishers 106 may submit requests for advertisements to the advertising management system 104. The advertising management system 104 responds by sending advertisements to the requesting publisher 106 for placement on one or more of the publisher's web properties (e.g., websites and other network-distributed content) that are relevant to the web property. For instance, if one of the publishers 106 publishes a sports-related web site, the advertising management system 104 can provide sports-related advertisements to the publisher 106. In some other implementations, the requests are executed by devices associated with the user 108, for instance, by execution of a JavaScript when the publisher's web page is loading on a client device.

In some implementations, the publisher 106 is a mobile application developer. A mobile application (e.g., application 206 in FIG. 2) is an application specifically designed for operation on a mobile device (e.g., mobile device 204 in FIG. 2), such as (but not limited to) a smartphone, a tablet computer, a personal digital assistant, and/or the like. The mobile application can also include one or more advertisements positioned within the content of the mobile application. Similar to other implementations, the advertisements can be received from the advertising management system 104 for placement in the mobile application when accessed by a user (e.g., when a particular page of a mobile application is loaded on the mobile device).

Figure 2:
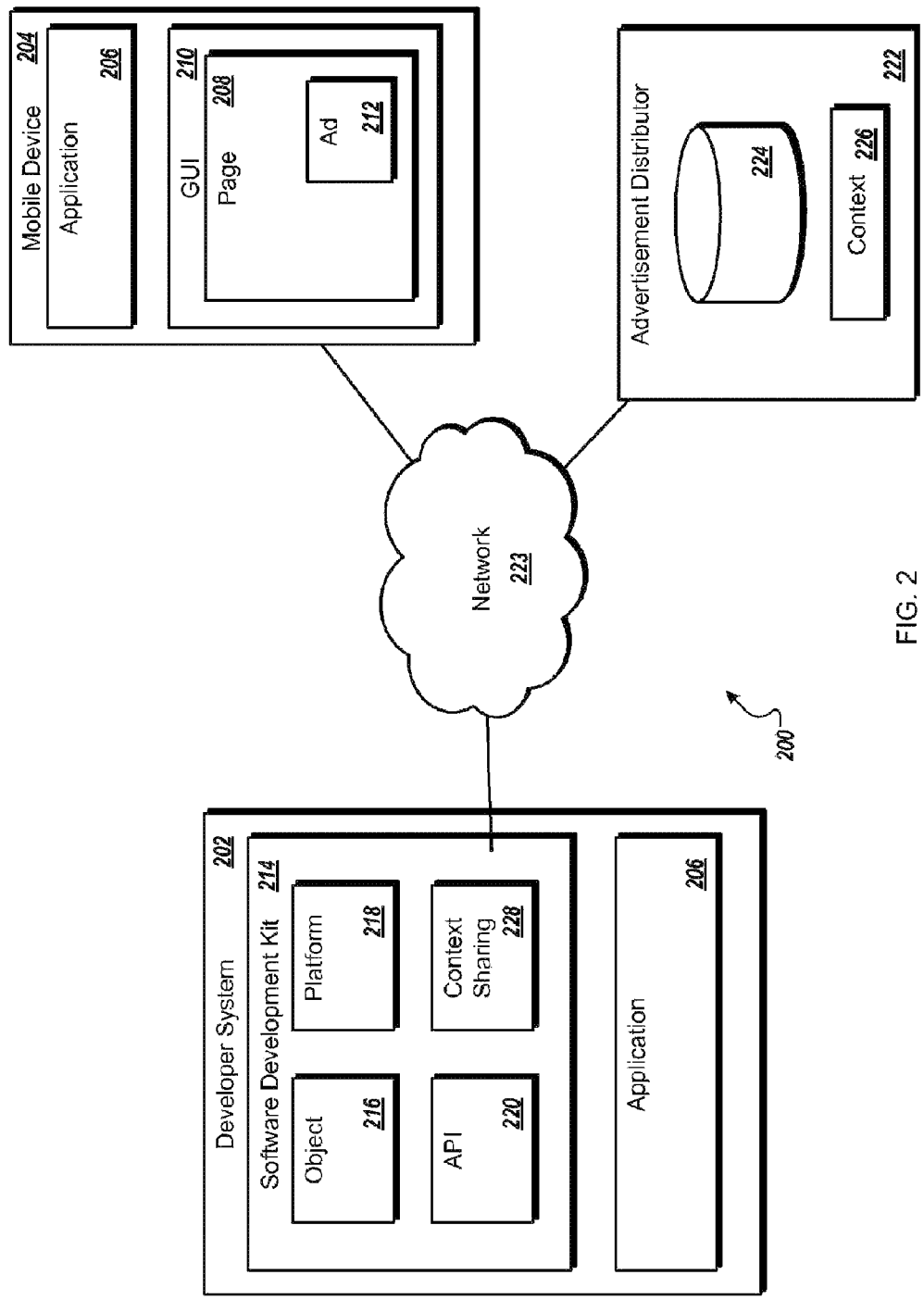
FIG. 2 is a block diagram of an advertising system including a mobile device application according to various implementations of the disclosure.

FIG. 2 is a block diagram of an advertising system 200 including a mobile device application according to various implementations of the disclosure. With reference to FIGS. 1 and 2, the advertising system 200 may include (but is not limited to) one or more features and/or components of the advertising system 100 and/or other advertising systems described in the disclosure.

A developer system 202 can be used by a developer to create program content such as applications for one or more mobile devices 204. The mobile devices 204 can include, for instance, a cellular telephone (smart phone), a personal digital assistant, a tablet computer, or any other type of mobile device. The developer can create a mobile application 206 such as by generating program code and compiling the program code into an executable program compatible with the mobile device 204. The application 206 can be formulated so that the application 206 presents one or more pages 208 in a graphical user interface 210 of the mobile device 204, such as on a display screen of the mobile device 204 (or otherwise associated with the mobile device 204). Individual systems and/or components can be implemented using hardware, firmware, software, or combinations thereof, and can be divided or joined into different number of units. Various implementations, as described in the disclosure, allow a developer to configure the application 206 so that content 212, for instance, as an advertisement from a third party (also referred to as an "advertisement" or "ad"), can be presented on the page(s) 208 when the application 206 is being executed.

A software development kit 214 can be provided to the developer for creating the application 206 and/or other programs. The software development kit 214 can provide (but is not limited to) editors for code and/or pseudocode, one or more compiling functions, emulating functions for previewing display content, and a debugging function, and/or the like. In some implementations, the software development kit 214 can also be configured to provide the developer a convenient way of adding third-party content such as advertisements to a program created for mobile devices. For instance, the software development kit 214 can provide the developer with the necessary code and/or other application content so that advertisements are requested, displayed to a user, and that any interaction between the user and the advertisement is tracked.

The software development kit 214 can provide one or more objects 216. In some implementations, the developer can incorporate the object 216 in the code when creating the application 206. For instance, the software development kit 214 can provide the object(s) 216 on a screen, such as where the developer generates the overall application content, in a way that the developer can select the object and include the corresponding material in the application 206 as the application (and/or application content) is being created.

The software development kit 214 can be configured so that the application 206 can be created according to a particular platform 218. In some implementations, the platform 218 can be targeted to mobile devices. For instance, the platform 218 can be a platform created or supported by the Open Handset Alliance. In some implementations, the object 216 is included before the application code is compiled into an executable program. For instance, the object 216 can be incorporated as an integrated part of the application 206 by inserting code before compilation.

The object 216 can perform one or more functions. In some implementations, the object can cause third party content, such as the advertisement 212, to appear on the mobile device 204. For instance, the object 216 can be responsible for requesting a relevant advertisement, displaying the advertisement in the right manner to the user, tracking whether the user clicks on the advertisement or otherwise interacts with the advertisement, and/or the like.

In some implementations, the object 216 is a Java object that is configured to be added to a user interface of the application 206 and handle fetching and rendering of, and interaction with, content such as advertisements. For instance, the developer can implement a view object that extends a view class associated with the application 206. In some implementations, an advertising view object could include the following: GoogleBaseAdView(String client). This object can represent a base class to create an advertisement view. A constructor can set the client parameter in a content advertisements request that can include a URL for a frontend involved in content requests. The above object can extend a more general view class, such as a WebView class used in some implementations from Google Inc. and can in some implementations be extended by other more specific classes directed at advertising. In particular implementations, such an extension can use void setAdLayoutType(int placement) to specify top and/or bottom placement of the view that requests the content. Other ways of displaying the content (e.g., an ad) can be used, such as a gallery that places thumbnails of image content in a gallery view.

One or more functions can be used with the object 216. Such function(s) can customize the look and feel of the content when it is displayed. In some implementations, such function(s) can set one or more CGI parameters in a content request.

An application program interface (API) 220 can be used with the object 216. In some implementations, the API is a Java API that a developer can call when incorporating content such as advertisements into the application 206. For instance, the object 216 can include a Java code snippet that uses the Java API 220 so that the developer can insert the code into the application 206. As noted earlier, such a code snippet can construct a request for the advertisement 212 (or other content) based on a developer's customization, fetch the content 212, provide the content 212 to the user interface of the application 206, and/or the like.

The advertisement 212 can include a number of different types of content. In some implementations, advertisement types including, but not limited to, text ads, image advertisements (including static and animated images), video ads, and/or the like can be used. For instance, the advertisement 212 can provide for user navigation (e.g., a link) to other content associated with the advertiser. Other types of content are possible (e.g., non-advertising content).

An advertisement distributor system 222 can be used to forward any type of content such as the advertisement 212 to the mobile device 204 and/or the developer system 202. In some implementations, the advertisement distributor system 222 is configured to receive request(s) for content from the mobile device 204, fetch one or more matching advertisements or other content from a repository 224, and forward the matching content to the mobile device 204. For instance, the matching of the advertisement 212 can be performed using a context component 226 that can provide one or more context parameters associated with the application 206 configured for identifying matching content/advertisements.

The developer system 202, the mobile device 204, and/or the advertisement distributor system 222 can be connected using any kind of network 223 (e.g., the Internet). The network 223 may represent one or both of local area networks (LAN) and wide area networks (WAN) and/or any other network environment. For instance, the developer system 202 and the advertisement distributor system 222 can communicate (but is not limited to) using the TCP/IP suite of protocols and the mobile device 204 can communicate using any kind of wireless protocol, such as (but not limited to) IEEE 802.11, WAP, Bluetooth, and/or the like.

Relevant context of the application 206 and/or the mobile device 204 can be shared in different ways. In some implementations, the developer can share context including metadata about the application 206 with the advertisement distributor system 222. A context-sharing component 228 in the software development kit 214 can allow the developer to enter one or more keywords that the developer decides are relevant for retrieving and presenting content such as advertisements. For instance, the developer who creates the application can submit the keyword(s) using the context-sharing component 228 for receipt by the context component 226 for storage. In some implementations, monitoring can be performed to determine how well the submitted metadata correlates with the application 206 and if necessary, modifications in the used context parameter(s) can be made.

In some implementations, context can be shared by the developer submitting the application 206 to the advertisement distributor system 222. The context-sharing component 228 can be used in submitting some or all of the application 206 for use in evaluating context. This can be done as part of a setup process so that the advertisement distributor system 222 can examine the application to determine the context of the advertisements to be forwarded. Aspects that can be taken into account include, but are not limited to, textual content of a previous screen or page on the mobile device 204, a content of the entire application 206 (and/or a portion thereof), a content of a video being played by the application 206, content of other view objects, such as sibling objects, and/or the like.

Analysis of the application 206 can include (but is not limited to) analyzing the code (e.g., by static analysis), determining a general context of the application 206, determining the specific context of one or more of the particular pages 208, and/or the like. This can require the context-sharing component 228 to determine which of the pages 208 is currently active in the mobile device 204. For instance, this can be done using a version of the application 206 provided by the developer. If or when the application 206 is later updated, a revised version can be forwarded to the advertisement distributor system 222, for instance using the context-sharing component 228, so that the context can be updated if necessary.

As another instance, context can be determined by providing that the developer can specify one or more hooks in the code of the application 206. In some implementations, the software development kit 214 and/or the platform 218 can provide such feature(s). For instance, a global variable can be made to change state at one or more stages of the application 206. Such a variable can be read by the object 216, such as by a snippet of Java code.

Context parameter(s) for use in finding matching content such as advertisements can be stored in any of a variety of forms. For instance, the context component 226 can store (but is not limited to) one or more keywords, categories, labels, topics, context information, and/or any other kind of parameter for use by the advertisement distributor system 222.

Therefore, according to some implementations, a developer can create the application 206 intended for the mobile device 204 using the software development kit 214. Particularly, the application 206 can be created according to the platform 218 and can include the object 216. The developer can forward the application 206 to the mobile device 204 for use, for instance when the device 204 is initially sold or as a later update, such as by a download process. The developer can also provide context relating to the application 206, such as by submitting one or more keywords and/or providing a version of the application 206, using the context-sharing component 228. One or more context parameters can be registered at the advertisement distributor system 222.

When a user operates the mobile device 204, content such as one or more advertisements 212 can be presented on the page(s) 208. The content can be selected for presentation by the advertisement distributor system 222 based on the context parameter(s). In some implementations, the user can interact with the ad(s) 212 in one or more ways, such as by clicking on the advertisement 212, performing a developer-specified combination of key presses (e.g., tapping a single key twice, tapping two keys in rapid succession, etc.), tapping on the advertisement on a touch screen device, and/or the like.

Content such as the advertisement 212 can be retrieved in any of a variety of ways. In some implementations, the advertisement 212 can be retrieved essentially according to an on-demand approach. For instance, the advertisement 212 or other content can be requested from the advertisement distributor system 222 and forwarded from there for display. Such implementations can have the advantage that the advertisement 212 that is displayed to the user can be very current to the particular state of the application 206 and/or the mobile device 204.

In some implementations, a pre-fetch approach can be used. For instance, a developer can configure the application 206 such that the advertisement 212 or other content is requested from the advertisement distributor system 222. The advertisement 212 can be stored at a suitable location, such as on the mobile device 204 and/or on another computer device such as a server that communicates with the mobile device 204. At some point, such as by determination performed by the application 206, the ad 212 can be displayed on the mobile device 204, for instance when the mobile device 204 returns to an online mode after having been offline. The developer can provide for reporting of which contents/ads 212 have been displayed, for instance by incorporating a feature from the software development kit 214 into the application 206. In some implementations, client-side frequency capping can be used, for instance by having a class associated with content/ad presentation track previously served content/ads and ensure that the same content/ad is presented according to a rule (e.g., not more than a predetermined number of times per session). Other approaches for fetching content can be used.

In some implementations, a new content portion such as the advertisement 212 can be presented when an activity that uses the class associated with content/ad presentation is displayed for the first time. As another instance, the new ad/content can be presented when the activity has been removed from an activity stack in the mobile device 204. In yet another instance, a content/ad can be presented if a previous ad/content has been displayed for a predetermined amount of time if the mobile device 204 continues to be active (e.g., if a backlight of the display on the device remains on). In some implementations, the developer can facilitate user-initiated refresh of content/ads via a class responsible for generating gallery views, for instance to provide a carousel-style browsing of ads.

In some implementations, the software development kit 214 can be extended or enhanced using a wizard in an interface directed toward publishers. For instance, the advertisement distributor system 222 can provide a user interface where publishers can establish an account to become affiliated with an advertising program, and this interface can feature the wizard as a way for the developer to customize the look and feel of content/ads to be displayed in connection with the application 206. In some implementations, this can be implemented as a self-service sign-up process for developers, for instance to allow the opportunity to enhance their application offering with advertisements and/or other content. As another instance, such an interface can provide reporting statistics on advertisement clicks, impressions, queries, revenue, and/or other aspects to the advertisement distributor system 222.

Thus in various implementations, the software development kit 214 is provided to a developer for developing the application 206 for the mobile device 204. The software development kit 214 inserts a preconfigured object (e.g., object 216) into the application 204. The object 216 is configured for requesting advertisements 212 for the application 206 before compilation. Accordingly, the advertisements 212 may be forwarded to the application 206 of the mobile device 204 based on requests or other instructions from the object 216.

Figure 3:
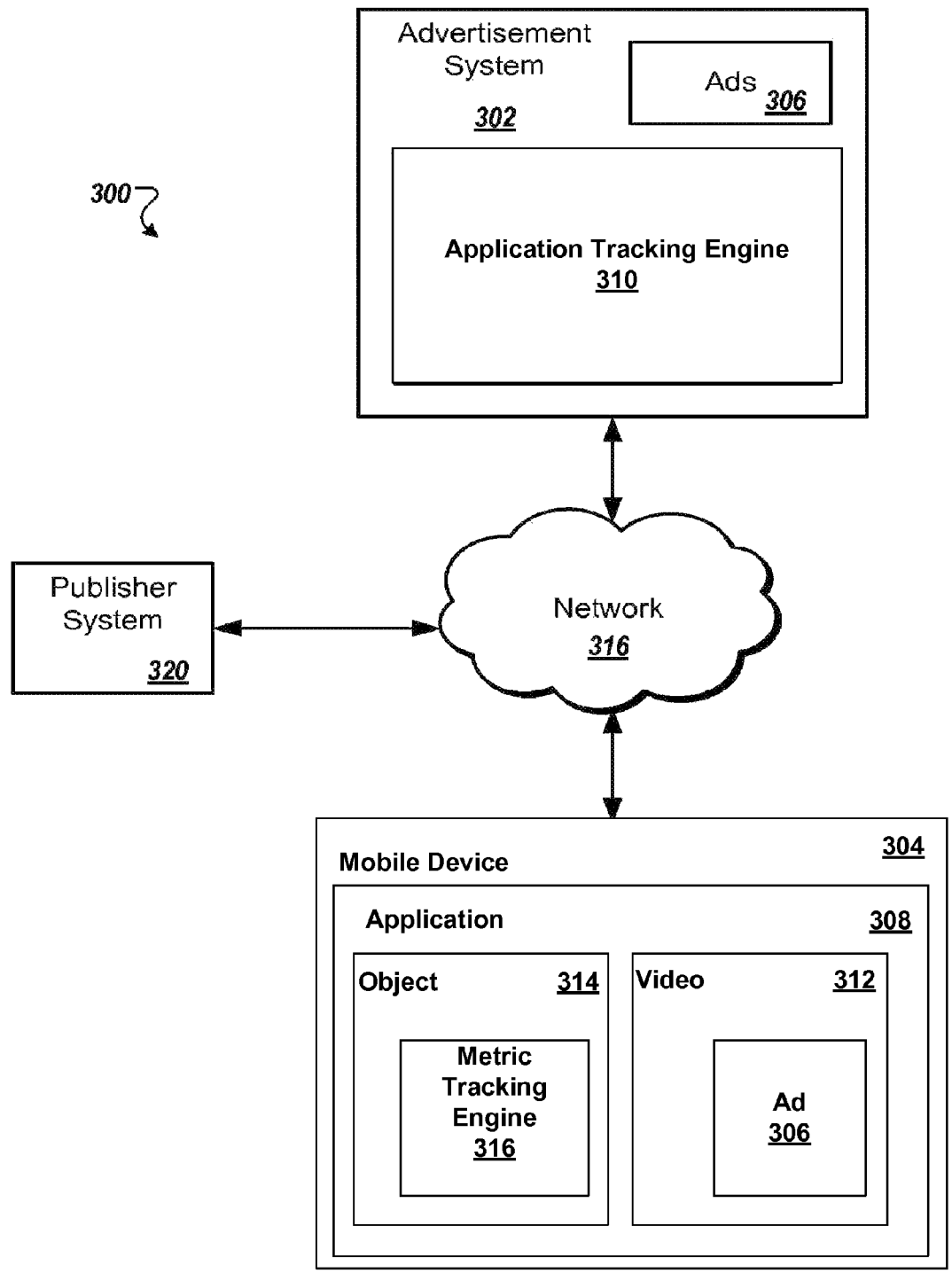
FIG. 3 is a block diagram of an advertising system including a mobile device according to various implementations of the disclosure.
Figure 4:
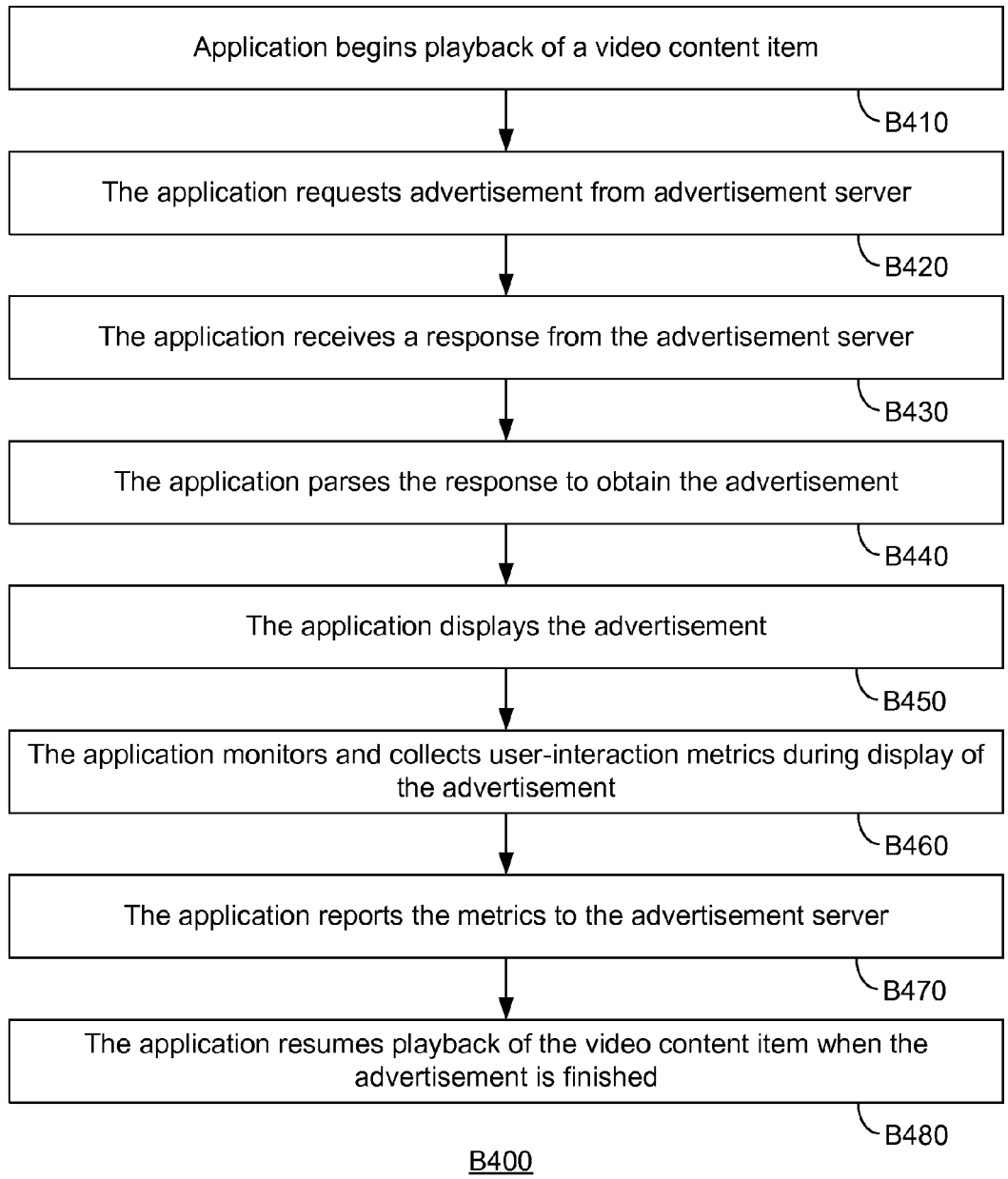
FIG. 4 is a flowchart of an advertising method according to various implementations of the disclosure.

FIG. 3 is a block diagram of an advertising system 300 including a mobile device 304 according to various implementations of the disclosure. With reference to FIGS. 1-3, the advertising system 300 may include (but is not limited to) one or more features and/or components of the advertising system 100, 200 and/or other advertising systems described in the disclosure.

The advertising system 300 can be used to serve advertisements and other content to a mobile device, which may be similar to the mobile device 204. The system 300 includes an advertisement system 302, which may be similar to the advertisement distributor 222. In some implementations, the mobile device 304 requests content from the advertisement system 302. The content may include, but is not limited to, one or more advertisements 306, web pages, video or audio streams, images, other media, and/or the like. The advertisement system 302 can serve content, including the advertisements 306, to the mobile device 304 for presentation on a user interface of the mobile device 304.

In some implementations, the publisher system 320 includes a content provider for providing content. Content provided by content provider 104 can include news, weather, entertainment, or other consumable textual, audio, or video media. More particularly, the content can include various resources, such as documents (e.g., webpages, plain text documents, Portable Document Format (PDF) documents, images, etc.), video or audio clips, and/or the like. In some implementations, the content can be graphic-intensive, media-rich data, such as, for example, Flash-based content that presents video and sound media.

The content provider may include a video server for serving a video content item, such as a video stream, a video file, and/or the like, to the mobile device 304. Further, video player applications (e.g., 308) may be used to render video files. Ads may be served in association with video content items. In implementations where audio-only content items can be provided, the video server can be an audio server instead, or more generally, a content server can serve video content items and audio content items.

The mobile device 304 (e.g., 224) can be a cellular telephone, a smartphone, a personal digital assistant, a tablet computer, or any other type of mobile device. In particular implementations, the mobile device 304 can be used to make telephone calls, voice over internet protocol (VoIP) calls, to browse the World Wide Web or any other type of network, and/or the like. The mobile device 304 can receive user input from (but not limited to) a touch screen interface, a keyboard, a trackball, a stylus, and/or the like. The mobile device 304 can connect to the advertisement system 302 through a network 316 (e.g., 223), such as the Internet. In other implementations, the network 316 is a LAN, a WAN, or any combination thereof. The mobile device 304 can communicate using any kind of wireless protocol, such as (but not limited to) IEEE 802.11, WAP, Bluetooth, and/or the like.

In various implementations, the mobile device 304 can include a browser (not shown) for browsing the Internet (e.g., the World Wide Web) and/or or for accessing other content on a network (e.g., documents, images, and other forms of media). The browser can request content from a publisher system 320, such as a search engine, for display on a user interface of the mobile device 304. The publisher system 320 can request advertisements from the advertisement system 302, such as one of the advertisements 306. The publisher system 320 can send the advertisements 306 to the browser such that the advertisements 306 are displayed on the browser along with the requested content. The publisher system 320 can connect to the network 316 and communicate with the advertisement system 302 and the mobile device 304 through the network 316. In some implementations, the browser can request a web page using a browser that includes one or more ads. Consequently, advertisements are requested from the advertisement system 302 for incorporation into the web page content. The advertisement system 302 can send one or more of the advertisements 306 to the browser. The browser can combine the requested content with the advertisements 306 for presentation on a user interface of the mobile device 304.

In some implementations, one or more mobile applications (or "apps") 308 running on the mobile device 304 requests advertisements from the advertisement system 302. The mobile applications 308 can be created for the mobile device 304, for instance, using the developer system 202. The types of mobile applications 308 can include games, utilities, news applications, configuration tools, video or media players, and/or the like. The mobile application 308 can be installed on the mobile device 304 before the device is initially sold by a manufacturer, or the mobile application 308 can be installed onto the mobile device at a later time (e.g., through a download process from a mobile device application store). In particular implementations, the application 308 includes an object 314 as provided by the software development kit 214. For instance, the object 314 may have been provided in the code of the application 308 prior to compilation of the application 308. The object 314 may allow for presenting advertisements during use of the application 308. Thus, in implementations in which the mobile application 308 is or includes a media player for playing or streaming media content, such as a video 312, the object allows for display of the advertisement 306 while the mobile application 308 is playing the media content on the mobile device 304 (e.g., while a user is using the mobile application 308 to watch the media content).

In various implementations, the application 308 may be configured (e.g., via the object 314 and the software development kit 214) to submit an advertisement request (or "ad request") to the advertisement system 302. Such an ad request may include ad spot information (e.g., a number of advertisements desired, a duration, type of ads eligible, etc.).

In some implementations, the ad request may also include information about the content item (e.g., 312) that triggered the request for the advertisements. This information may include the content item itself (e.g., a page, a video file, a segment of an audio stream, data associated with the video or audio file, etc.), one or more categories or topics corresponding to the content item or the content request (e.g., arts, business, computers, arts-movies, arts-music, etc.), part or all of the content request, content age, content type (e.g., text, graphics, video, audio, mixed media, etc.), geo-location information, and/or the like.

In particular implementations, the information in the ad request submitted by the application 308 may indicate characteristics of the video content item 312 that triggered the request for the advertisements. Such characteristics may be used to determine advertisements having a matching placement preference. For instance, the ad request may indicate whether the video content item allows pre-roll placement of ads, mid-roll placement, post-roll placement, overlaid placement, and/or the like. Alternatively or additionally, the ad request may indicate whether a viewer has capability of skipping advertisements. Then, advertisements with matching placement preference may be selected to be presented in or with the video content item. For instance, a video content item may allow only post-roll placement of advertisements (e.g., the advertisements may be presented only after the video content item has finished playing) and may not allow a viewer to skip advertisements. Then, those ads with the matching placement preference may be selected and placed relative to video content item based on the placement preference.

Throughout various implementations, multiple delivery mechanisms exist for advertising delivery by third parties, leveraging known protocols such as VAST. VAST is an XML document format describing an advertisement to be displayed in, over, or around a video player of the mobile application 308 or a wrapper pointing to a downstream VAST document, such as a video advertisement (e.g., 306), to be requested.

VAST (Digital Video Ad Serving Template) is a standard issued by the Interactive Advertising Bureau that establishes reference communication protocols between scriptable video rendering systems and advertisement servers, as well as associated XML schemas. Accordingly, such a protocol allows a developer to insert a video advertisement (or other advertisement) in a video content item. For instance, VAST helps standardize the service of video advertisements to web sites or applications (e.g., mobile application 308). VAST may be based, at least in part, on JavaScript included in the web page or application code, and may also aid in tracking traffic and managing cookies. VAST can also insert promotional messages in the pre-roll, post-roll, and during (e.g., linear advertisement) viewing of other video content, as well as overlaid on (e.g., non-linear advertisement) the video content item, delivered by the web site or the application. Using VAST, a web site owner or application developer need not concern himself or herself with selling or running the advertisements and still be able to receive revenue based on audience viewership/impressions and/or the like.

Throughout various implementations, a video advertisement (or other type of advertisement) inserted into a video content item played by the mobile application 308 may be a linear video advertisement or a non-linear video advertisement. A linear video advertisement is displayed in sequence before, during, or after the video content item being consumed by the user (e.g., as played on the mobile application 308). One of the key characteristics of a linear video advertisement is that the advertisement demands the full attention from the user as the advertisement takes over the user experience entirely, typically for a bounded period of time. In some implementations, the full advertisement experience may be open-ended. In some implementations, a clickable companion display advertisement is run adjacent to the player content window. In other implementations, a linear advertisement may be a non-video advertisement, such as a text advertisement, link advertisement, image advertisement (e.g., static image or animated image), and/or the like.

Non-linear advertisement formats run in parallel to the main video content experience. As a result, in some implementations, multiple stages to the advertisement display are employed. For instance, initially, there is some form of invitation or teaser unit that invites the user to further interact and usually expand the advertisement unit. A common instance of a non-linear advertisement format is an "overlay"-type advertisement, whose invitation is shown directly over the video content item as the video content item is played by the application 308. These non-linear advertisements are delivered as text, graphical banners/buttons, or as video and are placed within the video window, either over the content itself or directly on the top edge or bottom edge of the video content item during the content play. A key characteristic of non-linear advertisement formats is that the user may continue to view content while the initial advertisement is displayed.

In various implementations, the application 308 (e.g., via the object 314) includes a metric tracking engine 316 for collecting metrics relating to user interactions associated with the advertisement 306 presented in the mobile application 308. In particular implementations, the metric tracking engine 316 monitors and collects impression metrics and/or other metrics, non-limiting examples of which are provided in the disclosure, of the advertisement 306 presented in the mobile application 308. In some implementations, the metric tracking engine 316 sends the collected metrics to an application tracking engine 310, which may be provided on or otherwise associated with the advertisement system 302. The application tracking engine 310 may store and/or process the metrics received from the metric tracking engine 316.

Metrics for the linear video advertisements include, but are not limited to: Impression: The measurement and reporting of digital video impressions may be governed by the IAB Broadband Video Commercial Measurement Guidelines, found here:
http://www.iab.net/iab_products_and_industry services/ 1421/1443/1479, herein incorporated by reference in its entirety.

View: Often used as a synonym for "impression." Any measurement and reporting of a "view" should be governed by the "impression" definition above.

Video Click-through: Occurs when a user clicks on the linear video advertisement and is taken to the advertiser's web landing page.

Completed play: Occurs immediately upon completion of the video advertisement play (e.g., during normal speed).

Time spent viewing: Amount of video advertisement viewed at normal speed in seconds or other appropriate time-based units; if a rewind event occurs during play, time spent viewing may be calculated on total amount of video advertisement viewed at normal speed (e.g., including additional amounts of video viewed after rewind).

Percent complete: Percentage of video advertisement viewed continuously at normal speed. If a rewind event occurs during play, percent complete may be calculated on total amount of unduplicated video advertisement viewed at normal speed. Each section of video advertisement may only be considered once in the calculation. This definition governs the triggering of any "partial play" metrics, such as the common quartile percentages (25%, 50%, 75%). Specifically, any partial play reporting must be based on the trigger being activated based on normal viewing speed.

Audio mute: Indicates when a user clicks or otherwise activates the mute control.

Audio un-mute: Indicates when a user clicks or otherwise actives the un-mute control. If the un-mute control is the same as the mute control, the reporting should be able to differentiate the two events.

Collapse: Indicates when the user clicks or otherwise actives the Collapse control in order to contract the video-pane size. Often refers to contraction of the video advertisement to its original experience, but can be applied to any contraction of video-pane size.

Expand: Indicates when the user clicks or otherwise actives the Expand control in order to expand the video-pane size. Often refers to expansion of the video advertisement to a full-screen experience, but can be applied to any expansion of video-pane size.

Pause: Indicates that the video advertisement was intentionally stopped mid-play when the user clicks or otherwise activates a Pause control.

Resume: Indicates that the video advertisement was intentionally re-started mid-play when the user clicks or otherwise actives a Resume control. If the Resume control is the same as the Pause control, the reporting should be able to differentiate the two events.

Rewind: Indicates that a user clicks or otherwise activates a Rewind control in order to move backwards along the video advertisement timeline.

Metrics for non-linear advertisements, such as overlay advertisements and/or non-overlay invitation advertisements, include, but are not limited to:

Impression: Because of the underlying technologies used to create overlay ads, the measurement and reporting of overlay advertisement impressions may be governed by the IAB Rich Media Measurement Guidelines, found here: http://www.iab.net/iab_products_and industry_services/1421/1443/Rich Media Measurement, which is herein incorporated by reference in its entirety.

View: Often used as a synonym for "impression." Any measurement and reporting of a "view" should be governed by the "impression" definition above.

Click-through: Occurs when user clicks on the advertisement and is taken to the advertiser's web landing page.

Accept Invitation: Indicates that the user clicks or otherwise activates a control to expand the viewable area (or "takeover" the video content area) and launch an additional portion of the advertisement. A video advertisement is usually played upon acceptance, but other types of formats, including rich media, may be also used.

Minimize: Indicates that the user clicks or otherwise activates a control to minimize the advertisement without fully dispatching the advertisement from the player environment.

Close: Indicates that the user clicks or otherwise activates a close control that fully dispatches the advertisement from the player environment.

Overlay view duration: The time that the initial advertisement is displayed based on the time between the impression and either the completed length of display based on the agreement between publisher and advertiser or a close, minimize, or accept invitation event.

According to some implementations, these formats may launch additional video advertisement portions when the user chooses to launch additional content. Metrics reported on any additional video portions of the advertisement may be governed by the definitions for linear video advertisements.

Various methods may be implemented for determining when the advertisement system 302 should record or otherwise track an impression. In some implementations, an advertisement server redirect response is wrapped in additional XML including relevant tracking URIs ("XML Wrapper Method"). In some implementations, tag-based syntax to include impression and click tracking in the request may be used in much the same way as rich media works today ("Rich Media Method"). In some implementations, one or more advertisement servers may include fields in their trafficking interfaces for the entry of a number of reporting URIs from publishers and networks ("Multiple URI Method").

With reference to FIGS. 1-4, according to a method B400 of providing an advertisement, at block B410, the application 308 begins playback of a video content item 312. For instance, a video content item 312 (e.g., video file, video stream, etc.) is received by the mobile device 304 from the publisher system 320 (e.g., content provider), for example, in response to a request by the application 308. The application 308 may be or may include a video player module for playing the video content item 312.

At block B420, the application (e.g., via the object 314, which corresponds to the object 214) requests an advertisement 306 from an advertisement server (e.g., the advertisement server 302). The application 308 may request the advertisement before, during, or after playback of the video content item 312. A request may be in response to the application 308 detecting an advertisement slot in the video content item. The video advertisement is requested for placement in the detected advertisement slot and for display to the user when playback of the video content item reaches the advertisement slot. For instance, the object 314 of the application 308 may be configured to request an advertisement when the video content item 312 reaches a certain timestamp (e.g., as defined by the developer with the SDK 214) during playback by the application 308. In some implementations, one or more advertisement slots are added to the video content item by the developer of the application 308, for instance, via the SDK 214. That is, the developer may indicate parameters (e.g., position, length, frequency, etc.) of the advertisement slots in the video content item as part of the process of developing the application 308 or as a subsequent modification to the application 308. In some other implementations, parameters of advertisement slots in the video content item 312 are determined by an automated process. In some implementations, the request merely asks for one or more advertisements, without requesting for any specific advertisement. In other implementations, the request may ask for a specific advertisement. In particular implementations, the request includes information, such as (but not limited to) an identifier of the video content item (e.g., a video ID), metadata associated with the video content item, position of the advertisement slot, length of the advertisement slot, and/or the like.

At block B430, the application 308 receives a response from the advertisement system 302 in response to the request. The response may be based on the VAST standard. The advertisement system 302 may determine the response (e.g., advertisement for placement) based on any number of factors, including but not limited to the position of the advertisement slot relative to video feature content, identity of presenting application or mobile device, ability to skip advertisements, length of the advertisement slot, metadata associated with the video, any categories with which the video content item are associated, ad request preferences (e.g., post-roll placement only), and/or the like. Based on such factors, the advertisement system 302 may identify advertisements for providing to the application 308. At block B440, the application 308 parses the response to obtain information for playing the video advertisement (or other type of advertisement) 306. For instance, the response may include information on a location (e.g., an advertisement server part of or remote from the advertisement system 302) from which the video advertisement 306 may be received.

At block B450, the application 308 displays the video advertisement 306 (e.g., at the advertisement slot). The application 308 may display the advertisement 306 before, during, or after playback of the video content item 312. For instance, if the advertisement 306 is displayed during playback of the video content item 312, the application 308 may pause the video content item 312 while the advertisement 308 is displayed or the advertisement 308 may be overlaid on the video content item 312 (e.g., while the video content item 312 is paused or continues playing).

While the advertisement 306 is displayed, at block B460, the application 308 may monitor user-interaction metrics, for instance, whether the advertisement 306 was clicked on, muted, expanded, and/or the like. At block B470, the application 308 provides the metrics, for instance, to the application tracking engine 310, which may be provided on the advertisement system 302 or other suitable server. The metrics may be provided to the advertisement system 302 while the advertisement 306 is displayed or after the advertisement 306 is finished (e.g., upon resuming playback of the video content item 312, after the video content item 312 has finished, etc.). At block B480, the application 308 may resume normal playback of the video content item 312 upon completion of the advertisement 306. For instance, if the video content item 312 was paused (or not yet started), the application 308 may resume playback of the video content item 312. Or for instance, if the advertisement 306 was overlaid on the video content item 312, the application 308 may resume playback of the video 312 free of any objects or the like overlaid on the video content item 312.

In some implementations, delivery of video advertisements 306 may be improved by using a set of key-value pairs that can be added to the advertisement tag request (e.g., as in block B420) in order to reduce errors resulting from incorrect advertisement responses. For instance, if a publisher only wishes to receive Windows Media-formatted video advertisements or wants to receive advertisements of a certain duration (e.g., 30 seconds), an advertisement serving vendor may wish to define the advertisement tag in such a way as to only provide advertisements with those specifications.

In some implementations, delivery of video advertisements 306 may be improved by providing communication between the video advertisement and the video player application 308 in which the video advertisement is displayed. This communication is important because both Linear and Non-Linear video advertisements can be interactive, and such user interaction will generally affect the activity of the video player application 308. For instance, when a user clicks on an overlay advertisement 306, the user may be presented with more information about the advertiser, while the video content item 312 being played on the video player application 308 is expected to pause.

Various implementations allow an advertiser to book an advertisement campaign that delivers on both mobile devices and computers (e.g., via an HTML browser). Accordingly, the advertiser may target videos (e.g., place video advertisements within the videos) that are syndicated across web sites and mobile platforms, and that may appear on desktop web or mobile applications.

Various implementations allow an advertiser to insert a video advertisement into a mobile application of a mobile device or other electronic device, such a desktop computer that is adapted to execute such applications. For example, the application may be of a type downloadable through an application store or the like and/or is compatible for usage on a mobile phone, tablet computer, and a desktop/laptop computer.

Various implementations allow an advertiser to reach an audience across devices with a coordinated set of creatives. Accordingly, after a user is first exposed to the advertiser via the desktop web, a user can receive further exposures to the advertiser on whichever device the user happens to be using at the time (e.g., mobile device or desktop computer).

Various implementations allow a trafficker to book an advertisement campaign that crosses mobile and web (HTML) contexts, allowing an advertisement budget to apply to both types of contexts. Accordingly, the trafficker does not need to make two separate orders (e.g., mobile and web) for advertisements and specify which portion of the budget goes to each advertisement order as advertisements can be drawn from a collective pool.

Various implementations allow a publisher to sell advertisements on his or her mobile site (e.g., via a mobile application) at the same time as the publisher sells advertisements on his or her HTML site. Accordingly, the publisher is provided with a better and larger pool of impressions to sell and a wider reach of users.

In some implementations, the features provided in the disclosure relate to providing video advertisements (or other types of advertisements) in a video stream of a native mobile application (e.g., iOS, Android) on a mobile device. In other implementations, the features may relate to providing video advertisements (or other types of advertisements) in a video stream of a native application on any suitable electronic device (in addition to or in place of a mobile device). The electronic computing device can be, but is not limited to, a set-top box, a smart TV, a disk player (e.g., Blu-Ray, high-definition digital versatile disc (HD-DVD), a digital versatile disc (DVD), a digital video recorder (DVR), a video game system, or another computing device. Accordingly, for instance, a developer may develop an application for use on a smart TV or other electronic device that allows inclusion of video advertisements into video streams played by the application.

In various implementations, the electronic computing device is or includes a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device.

A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content that is then displayed on the television screen or other display device. A smart television module may be configured to provide a home screen or top level screen including icons for a plurality of different applications, such as a web browser and a plurality of streaming media services, a connected cable or satellite media source, other web "channels," and/or the like. The smart television module may further be configured to provide an electronic programming guide to the user.

Figure 5:
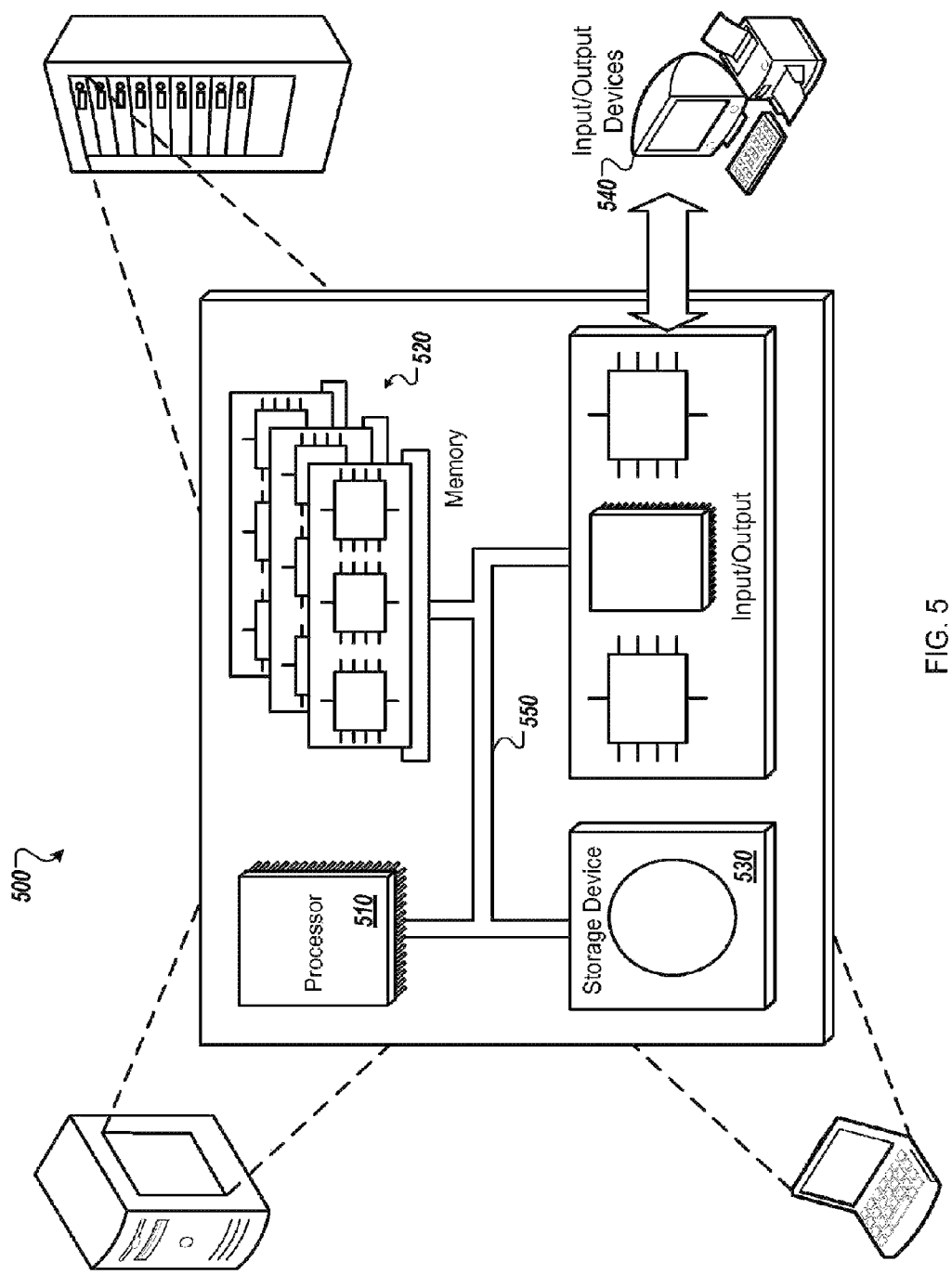
FIG. 5 is a block diagram of a computing system according to various implementations of the disclosure.

FIG. 5 is a schematic diagram of a generic computer system 500. The system 500 can be used for the operations described in association with any of the computer-implemented methods (e.g., by the mobile device 304 in FIG. 3) described in the disclosure, according to various implementations. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In some implementations, the processor 510 is a single threaded processor. In other implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In other implementations, the memory 520 is a non-volatile memory unit.

The storage device 530 can include any suitable type of storage including, for example, a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or any other type of storage medium. The storage device 530 may be (or include) volatile memory (e.g., random access memory, RAM) coupled with the bus 550 for storing information and instructions for the processor 510 and/or a non-volatile memory (e.g., read only memory, ROM) coupled with the bus 550 for storing static information and instructions for the processor 510. In other implementations, memory may be implemented using any machine-readable or computer-readable media capable of storing data such as (but not limited to) volatile memory or non-volatile memory, removable or nonremovable memory, erasable or non-erasable memory, writeable or re-writeable memory, and/or the like. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), or any other type of media suitable for storing information. In some implementations, a PC board or the like can contain, for example, the processor 510, the bus 550, the RAM, the ROM, and/or the like.

The input/output device 540 provides input/output operations for the system 500. In some implementations, Some non-limiting examples of input devices for providing data to the system 500 include, but are not limited to, a keyboards, a pointing device (e.g., a mouse), a microphone, a touch input interface, a joystick, a game pad, a satellite dish, a scanner, and/or the like. In some implementations, an output device may include (but is not limited to) a monitor or other types of display devices, which can be connected to the bus 550 via an appropriate interface. In addition (or instead of) the monitor, the user terminal may include other (peripheral) output devices (not shown), such as speakers and printers for example. In some cases, the output device can include a component for providing one or more of a visual output, a haptic output, or an audio output.

In various implementations the system 500 also includes a communication module that may be part of (or otherwise associated with) the I/O interface device 540 or other suitable module. The communication module may comprise one or more transceivers configured to communicate using different types of protocols, communication ranges, operating power requirements, RF sub-bands, information types (e.g., voice or data), use scenarios, applications, and/or the like. In various implementations, the communication module may comprise one or more transceivers configured to support communication with local devices (e.g., personal device 10, base station, server, and/or the like) using any number or combination of communication standards.

In various implementations, the communication module can also exchange voice and data signals with devices using any number or combination of communication standards (e.g., GSM, CDMA, TDNM, WCDMA, OFDM, GPRS, EV-DO, WiFi, WiMAX, S02.xx, UWB, LTE, satellite, etc). The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). CDMA2000 covers IS-2000, IS-95, and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). Power for the communication module may be supplied by battery cells.

In various implementations, the communication module may comprise one or more transceivers configured to perform data communications in accordance with one or more wireless communications protocols such as (but not limited to) WLAN protocols (e.g., IEEE 802.11 a/b/g/n, IEEE 802.16, IEEE 802.20, etc.), PAN protocols, Low-Rate Wireless PAN protocols (e.g., ZigBee, IEEE 802.15.4-2003), Infrared protocols, Bluetooth protocols, EMI protocols including passive or active RFID protocols, and/or the like.

The communication module may be coupled to the bus 550 for providing a communication link between the system 500 and a communication network (e.g., 123, 223, 316). As such, the communication module enables the processor 510 to communicate wirelessly with other electronic systems coupled to the network. For instance, the communication module may be coupled to an antenna (not shown) and provides functionality to transmit and receive information over a wireless communication interface.

It is understood that the specific order or hierarchy of steps in the processes disclosed is an instance of illustrative approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For instance, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the implementations disclosed herein may be implemented as electronic hardware, computer software embodied on a tangible medium, or combinations of both. To clearly illustrate this interchangeability of hardware and software, various illustrative components, blocks, modules, circuits, and steps have been described above generally in terms of their functionality. Whether such functionality is implemented as hardware or software embodied on a tangible medium depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more illustrative implementations, the functions described may be implemented in hardware, software or firmware embodied on a tangible medium, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For instance, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

What is claimed is:

1. A method for managing content provided to a mobile device, the method comprising:

requesting, by an application executing on the mobile device, a content item from a content server, wherein the application is native to a platform of the mobile device and operates using an operating system of the mobile device;

reporting, by a content manager object integrated with the application executing on the mobile device, a context of the application to the content server, wherein the context is a current state of the application executing on the mobile device;

receiving, by the content manager object, a content item selected by the content server based on the requesting, wherein the content manager object is targeted to a platform of the mobile device and integrated with the application executing natively on the mobile device using a software development kit prior to compiling the application by a developer of the application executing natively on the mobile device, wherein the content server selects the content item using the context of the application based on context parameters associated with the application and stored at the content server, wherein the context parameters are provided to the content server by the application developer using a context sharing component of the software development kit;

reconfiguring, by the content manager object, the content item received from the content server and controlling, by the content manager object, presentation of the content item via the mobile device, wherein the content manager object is native to a platform of the mobile device and operates using an operating system of the mobile device;

identifying, by the content manager object, metric associated with the content item; and transmitting, by the content manager object, the metric to the content server.

2. The method of claim 1, wherein the content item comprises a video-content item.

3. The method of claim 1, wherein the content item is requested by the application in response to the application playing a video.

4. The method of claim 3, wherein reconfiguring and controlling presentation of the content item includes reconfiguring the content item for presentation during playback of the video and presenting the content item during playback of the video.

5. The method of claim 4, wherein the content item is overlaid on the video during playback of the video.

6. The method of claim 3, wherein reconfiguring and controlling presentation of the content item includes reconfiguring the content item for presentation before playback of the video and presenting the content item before playback of the video.

7. The method of claim 3, wherein reconfiguring and controlling presentation of the content item includes reconfiguring the content item for presentation after playback of the video and presenting the content item after playback of the video.

8. The method of claim 3, further comprising:
pausing playback of the video while the content item is presented.

9. The method of claim 3, wherein the video includes a content item slot and the method further comprises:
presenting the content item in the content item slot.

10. The method of claim 3, wherein the video includes a content item slot and wherein the content item is requested based on the content item slot.

11. The method of claim 1, wherein the content item comprises one or more of a text content item, a graphic content item, a still-image content item, a banner content item, and a link content item.

12. The method of claim 1, wherein the metric measures user interactions with the content item while the content item is presented.

13. The method of claim 1, wherein receiving the content item received from the content server based on the requesting comprises:
receiving a response from the content server based on the requesting;
parsing the response to obtain information for receiving the content item; and
receiving the content item based on the parsed response.

14. The method of claim 13, wherein the response is a Video Ad Serving Template (VAST)-formatted extended markup language (XML) document.

15. A computer program product for managing content provided to a mobile device, the computer program product comprising:
a non-transitory tangible computer-readable storage medium comprising code for:
requesting, by an application executing on the mobile device, a content item from a content server, wherein the application is native to a platform of the mobile device and operates using an operating system of the mobile device;

reporting, by a content manager object integrated with the application executing on the mobile device, a context of the application to the content server, wherein the context is a current state of the application executing on the mobile device;

receiving, by the content manager object, a content item selected by the content server based on the requesting, wherein the content manager object is targeted to a platform of the mobile device and integrated with the application executing natively on the mobile device using a software development kit prior to compiling the application by a developer of the application executing natively on the mobile device, wherein the content server selects the content item using the context of the application based on context parameters associated with the application and stored at the content server, wherein the context parameters are provided to the content server by the application developer using a context sharing component of the software development kit;

reconfiguring, by the content manager object, the content item received from the content server and controlling, by the content manager object, presentation of the content item via the mobile device, wherein the content manager object is native to a platform of the mobile device and operates using an operating system of the mobile device;

identifying, by the content manager object, a metric associated with the content item; and transmitting, by the content manager object, the metric to the content server.

16. The computer program product of claim 15, wherein the content item comprises a video content item.

17. The computer program product of claim 15, wherein the content item is requested by the application in response to the application playing a video.

18. The computer program product of claim 15, wherein the metric measures user interactions with the content item while the content item is presented.

19. A system for managing content provided to a mobile device, the system comprising:
a content manager object targeted to a platform of the mobile device and integrated with an application executing natively on the mobile device prior to compiling the application, wherein the application is native to a platform of the mobile device and operates using an operating system of the mobile device, wherein the content manager object is configured to
report a context of the application to a content server, wherein the context is a current state of the application executing on the mobile device,
receive a content item requested by the application and selected by the content server, wherein the content server selects the content item using the context of the application based on context parameters associated with the application and stored at the content server,
reconfigure the content item received from the content server, and
control presentation of the content item via the mobile device; and
a metric tracking engine included with the content manager object and configured to
collect a metric associated with the content item, and
provide the metric to the content server, wherein the content manager object is native to a platform of the mobile device and operates using an operating system of the mobile device.

20. The system of claim 19, wherein the content item comprises a video content item.

21. The system of claim 19, wherein the content item is requested by the application in response to the application playing a video.

22. The system of claim 19, wherein the metric measures user interactions with the content item while the content item is presented.

23. A system for managing content provided to a mobile device, the system comprising:
- a software development kit for creating a content manager object targeted to a platform of the mobile device and for integrating the content manager object into an application developed for the mobile device prior to compiling the application, wherein the application is native to a platform of the mobile device and operates using an operating system of the mobile device;
- wherein the software development kit configures the content manager object to
  - report a context of the application to a content server, wherein the context is a current state of the application executing on the mobile device,
  - receive a content item requested by the application and selected by the content server when the application is executed by the mobile device, wherein the content server selects the content item using the context of the application based on context parameters associated with the application and stored at the content server,
  - control presentation of the content item via the mobile device,
  - collect a metric associated with the content item, and
  - provide the metric to the content server,
- wherein the content manager object is native to a platform of the mobile device and operates using an operating system of the mobile device.

24. The system of claim 23, wherein the content item comprises a video content item.

25. The system of claim 23, wherein the content item is requested by the application in response to the application playing a video.

26. The system of claim 23, wherein the metric measures user interactions with the content item while the content item is presented.

* * * * *